April 17, 1951     D. B. McLAUGHLIN ET AL     2,549,699
PHOTOGRAPHIC METHOD AND APPARATUS
Filed Sept. 19, 1945     3 Sheets-Sheet 1
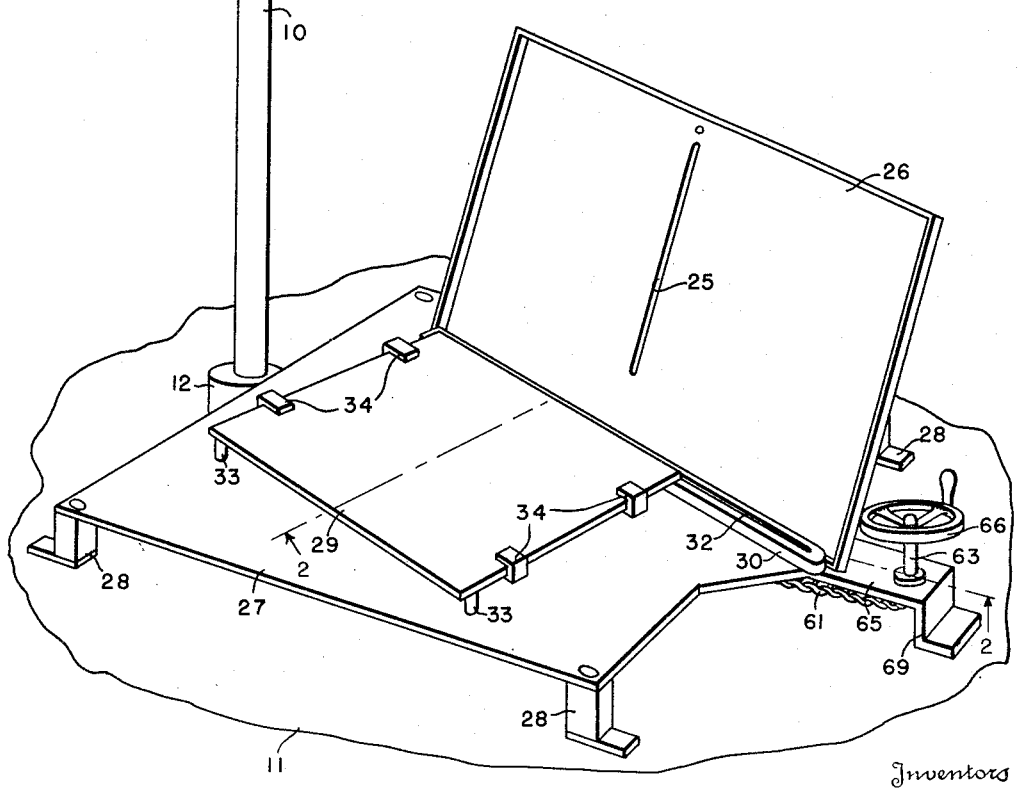
Inventors
DEAN B. McLAUGHLIN
GERALD S. PERKINS
By Ralph L Chappell
           Attorney

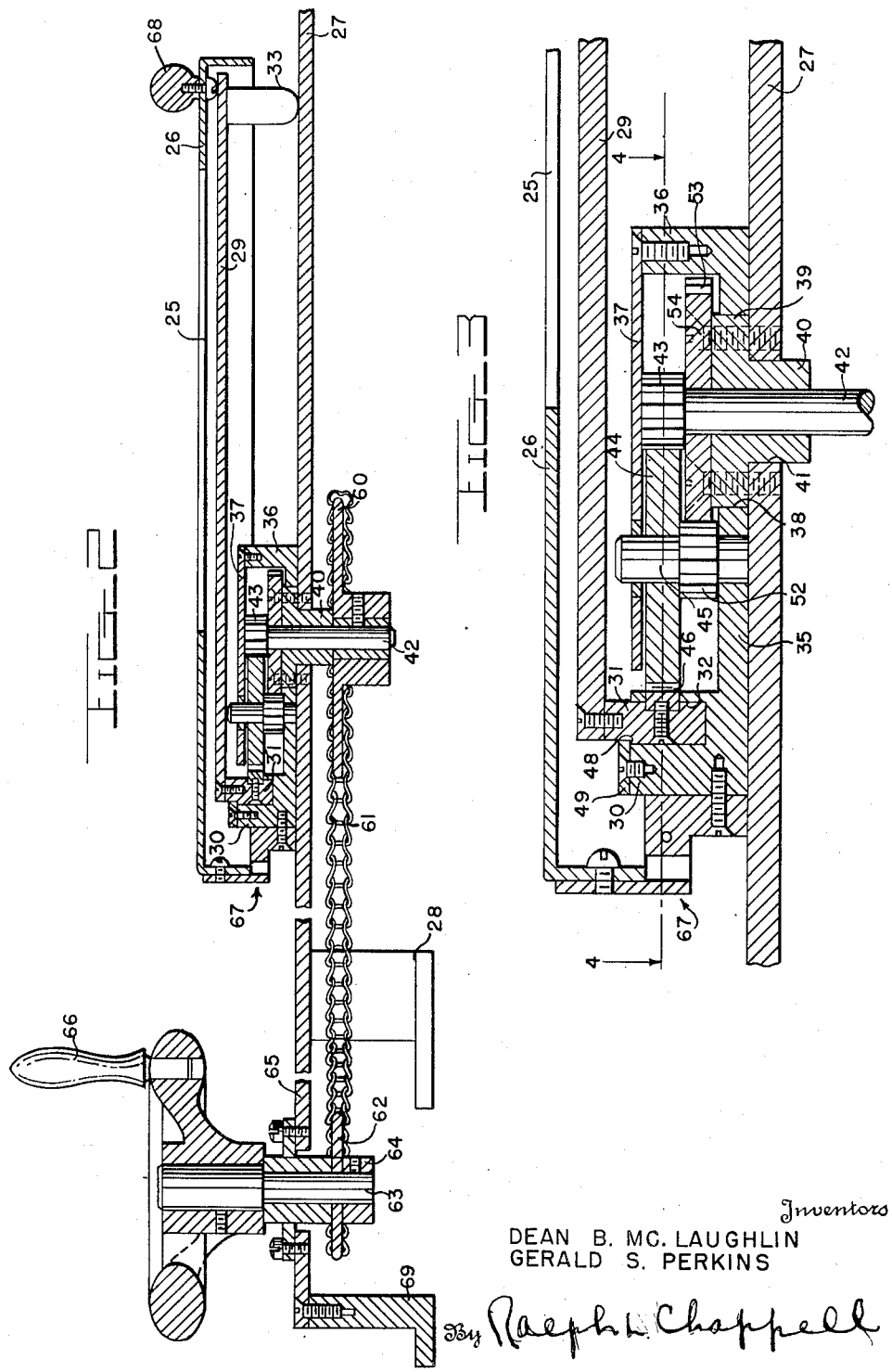

April 17, 1951 D. B. McLAUGHLIN ET AL 2,549,699
PHOTOGRAPHIC METHOD AND APPARATUS
Filed Sept. 19, 1945 3 Sheets-Sheet 3
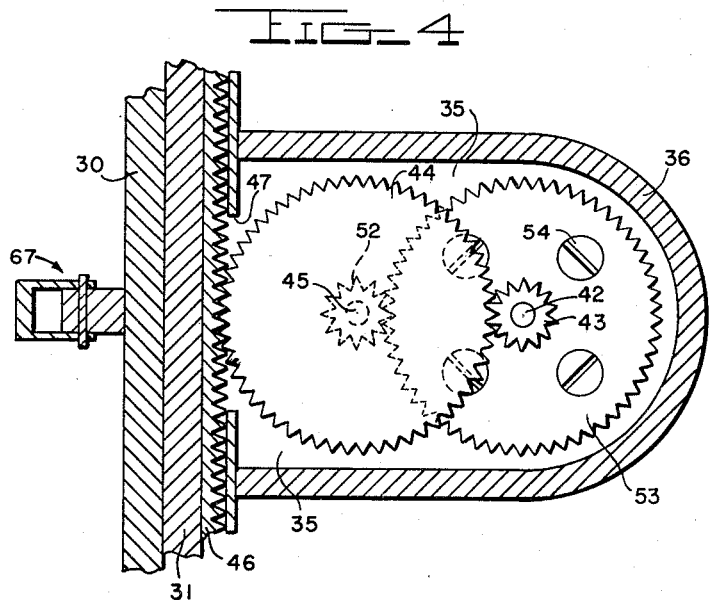
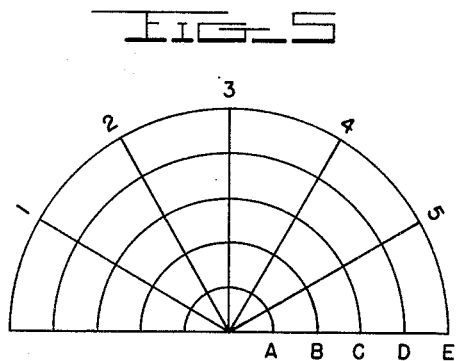
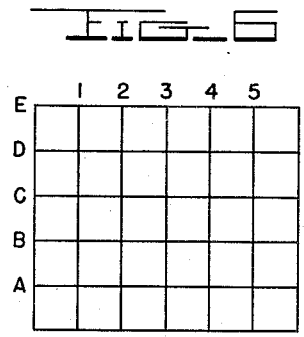
Inventors
DEAN B. MC. LAUGHLIN
GERALD S. PERKINS
By Ralph L Chappell
Attorney Patented Apr. 17, 1951

2,549,699

UNITED STATES PATENT OFFICE 2,549,699

PHOTOGRAPHIC METHOD AND APPARATUS

Dean B. McLaughlin and Gerald S. Perkins, Cambridge, Mass., assignors, by mesne assignments, to the United States of America as represented by the Secretary of the Navy Application September 19, 1945, Serial No. 617,370

6 Claims. (Cl. 88—24)

This invention relates to photographic methods and apparatus and more particularly to a photographic method and apparatus for converting a photograph in which range and bearing are plotted along polar coordinates into one in which range is plotted at right angles to bearing.

In employing radar equipment it is generally the practice to present the information furnished by the radar as to the distance and the direction of the target relatively to the radar apparatus on a cathode-ray tube. In one type of radar apparatus, the sweep current flows through the vertical deflecting coils while a positioning current controlled by the radar antenna position flows through the horizontal deflecting coils so that the position of the vertical sweep is aligned with the position in azimuth of the antenna, which may scan a region up to 90° on either side of dead ahead of the antenna. The return signals, or echoes, are used to intensity modulate the cathode-ray beam to cause the target indication to appear as a bright spot on the cathode-ray tube screen. Thus the range is presented vertically while bearing is presented horizontally, or at right angles to range.

In another type of radar presentation, a map of the area being scanned is presented in polar coordinates, with the antenna position occupying the center of the cathode-ray tube screen. This is referred to as the plan position indicator type of presentation. The indicator tube, which is generally of the electro-magnetic type, is intensity modulated with the sweep moving from the center radially outward. The sweep position is controlled by and synchronized with the antenna position throughout 360° of antenna rotation. In this type of presentation, the top of the screen generally represents dead ahead; thus, if the antenna is pointing dead ahead, the sweep moves from the center of the screen to the top. Likewise, if the antenna points 90° from dead ahead, the sweep moves from the center radially outward at an angle of 90° from dead ahead. Thus a polar map is developed on which the range is plotted radially against the position in azimuth or bearing.

As described in the co-pending application of Richard A. Florsheim, Serial No. 615,483, filed September 10, 1945, the plan position indicator type of presentation may be simulated photographically by photographing a relief map of the area under consideration, the relief map having a point source of illumination located thereon at a point substantially corresponding to the location of the radar apparatus. Among other purposes for which such photographs are employed, such photographs may be utilized in assisting the radar operator to interpret the radar presentation by comparing the radar presentation with the photograph. Such photographs are also employed in training and briefing radar operators. It will be apparent, however, that unless the radar operator is using a plan position type of indicator, such photographs will be of limited value. In order to make possible direct comparison of such photographs with a radar presentation in which range is plotted along an axis at right angles to the axis on which bearing is plotted, it, therefore, becomes desirable to provide some method and means whereby such photographs may be converted to photographic simulations in which range and bearing are plotted at right angles to each other.

An object of this invention is to provide an efficient and effective photographic method and apparatus for converting a photograph in which range and bearing are plotted along polar coordinates to one in which range is plotted at right angles to bearing.

In accordance with one embodiment of this invention, a photographic transparency is placed in a projection printing apparatus and the image of the transparency is projected thereby onto a photosensitive paper or film mounted in an easel. During the exposure the paper or film is moved by the easel laterally relatively to a slot formed in a mask positioned over the film or paper, the slot extending at right angles to the path of lateral movement, while at the same time the mask and paper or film are moved together in an arcuate path, the axis of which is aligned with the center of the projected image and with the base of the slot.

Other objects and advantages of the present invention will be apparent from the following detailed description taken in conjunction with the drawings wherein:

Fig. 1 is a fragmentary, perspective view of a projection printing apparatus having associated therewith an easel constructed in accordance with one embodiment of this invention;

Fig. 2 is an enlarged, fragmentary, vertical sectional view taken substantially along the line 2—2 of Fig. 1, showing, however, the easel rotated to its mid-position;

Fig. 3 is an enlarged sectional view similar to Fig. 2 showing particularly the gearing;

Fig. 4 is a horizontal sectional view taken substantially along the line 4—4 of Fig. 3;

Fig. 5 is a diagrammatic illustration of a map in which range and bearing are plotted along polar coordinates; and Fig. 6 is a diagrammatic illustration of a map in which range is plotted at right angles to bearing.

Referring now to the drawings, and particularly to Fig. 1 thereof, it will be seen that a substantially conventional projection printing apparatus is there illustrated. This apparatus comprises a vertically disposed standard or post 10 which is rigidly supported on a suitable base 11, such as a bench or table, by an associated pedestal member 12. A bracket 13 is slidably mounted on the upper portion of the standard 10, being vertically and pivotally adjustable thereon. The bracket 13 may be locked in position by a large set screw 14 which extends transversely through a side of the bracket and may be adjusted to bear against the periphery of the standard 10. The bracket 13 serves as a support for a negative carrier housing 15 which is mounted on the outer end thereof and which supports on its upper side a lamp housing 16. A suitable transverse slot is formed in the negative carrier 15 to receive a removable negative carrier 17, as is well known in the art. A bellows 18 is fixed to the under side of the negative carrier housing 15 and has fixed to the lower end thereof a lens 19 whereby an image of the negative or transparency located in the negative carrier 17 may be projected on a sensitized film or paper located beneath the lens 19.

The apparatus thus far described, as will be readily apparent, is a conventional projection printing apparatus, and it will be understood that any suitable projection printing apparatus may be used. In using such a projection printing apparatus a transparency is located in the negative carrier 17 and the negative carrier 17 positioned in the negative carrier housing 15. The image of the negative is then projected by the lens 19 and the size of the projected image will depend upon the focal length of the lens 19 and the distance of projection.

Since it is the purpose of this invention to convert a photographic simulation wherein range and bearing are presented in polar coordinates to a photographic simulation in which range is plotted at right angles to bearing, an easel of unique design is employed whereby during the exposure the paper or film on which the projected image is imposed is moved laterally relatively to a slot 25 formed in a mask 26 positioned over the film or paper, the slot extending at right angles to the path of lateral movement, while at the same time the paper or film together with the mask are moved by the easel in an arcuate path, the axis of which is aligned with the center of the projected image and with the base of the slot 25. In this manner a polar coordinate type map such as shown in Fig. 5 may be directly converted to a map such as shown in Fig. 6, wherein range is plotted at right angles to bearing.

In the specific embodiment shown in the drawings, the easel comprises in addition to the mask 26 a large base plate 27 which is supported on and spaced from the table 11 by a number of pedestal members 28 located substantially at the four corners thereof. A paper supporting platen 29 is supported on and parallel to the upper surface of the large plate 27 by a channel bar 30 of substantially greater length than the length of the platen 29, the platen 29 being provided along its left edge as viewed in Fig. 2 with a rail 31 which is mounted on the underside thereof and disposed in the slot 32 formed in the channel bar 30 and extending substantially the length thereof. A pair of short rods 33 are mounted on the under side of the right edge of the platen 29 at opposite corners thereof as viewed in Fig. 2 and their lower ends bear against the upper surface of the large plate 27. A number of clips 34 are associated with the platen 29 and serve to retain a sheet of film or paper thereon during exposure.

Referring now to Figs. 2, 3 and 4, wherein is shown the mechanism whereby the platen 29 is reciprocated relatively to the channel bar 30 while at the same time the channel bar 30 is caused to move about an axis located at the base of the slot 25, it will be seen that the right lower side, as viewed in these three drawings, of the channel bar 30 has integrally formed therewith adjacent the mid-portion of the lower right side thereof a plate 35, which, as viewed in Fig. 4, is U-shaped in configuration. This plate forms a base for the gear housing which also includes a U-shaped side wall 36, which may be integrally formed with the edges of the plate 35 and extend upwardly therefrom a short distance, and a cover plate 37 mounted on the upper surface of the U-shaped side wall 36. The base plate 35 has formed therein a large circular aperture 38 in which is disposed a flanged portion 39 of a sleeve bearing 40, the lower end of the sleeve bearing 40 extending through an aperture 41 formed in the easel base 27. A shaft 42 is journaled in the sleeve bearing 40 and has mounted on and keyed to the upper end thereof a small spur gear 43 whereby a large pinion gear 44 is driven. The pinion gear 44 is mounted on and keyed to a short stub-shaft 45, the lower end of which is journaled in the base plate 35 of the gear housing, while the upper end thereof is journaled in the cover plate 37. The shaft 45 is suitably spaced from the shaft 42. The pinion gear 44 engages a rack 46 which is mounted along the right side of the rail 31, as viewed in these three drawings. The rack 46 extends substantially the length of the rail 31 and a suitable aperture 47 is formed in the right side wall of the channel bar 30 adjacent the periphery of the pinion gear 44 to permit the gear 44 to engage the rack 46.

Rotation of the spur gear 43 will cause the pinion gear 44 to rotate and consequently causes the rack and associated rail 31 to move relatively to the channel bar 30 in a direction governed by the direction of rotation of the shaft 42. In order to prevent the rail 31 from lifting out of the slot 32 formed in the channel bar 30, the upper left portion of the rail is recessed slightly to form a ledge 48 and a retaining plate 49 is mounted on the adjacent surface of the channel bar and extends over the ledge 48, thus preventing the rail from lifting out of the channel slot 32 as the rail is moved therealong.

In order to rotate the assembly about an axis aligned with the base of the slot 25 formed in the mask 26, the base of the slot 25 is so located as to coincide axially with the axis of rotation of the shaft 42. In rotating the assembly about the axis of the shaft 42, the entire gear housing rotates about the shaft 42. This is accomplished by mounting a small planet gear 52 on the shaft 45 which supports the pinion gear 44 intermediate the pinion gear 44 and the base 35 of the gear housing. The gear 52, which is keyed to the shaft 45, engages a fixed, sun gear 53 which is mounted on the shaft 42 beneath the gear 43, but which does not rotate with the shaft 42. The gear 53 is fixed to the flange 39 of the sleeve bearing 40 and to the easel base 27 by a number of screws 54 which are carried by the gear 53, extend through the flange 39, and threadedly engage the easel base 27. Since the gear 53 is fixed, when the planet gear 52 is rotated by the shaft 45 the gear 52 will travel epicyclically around the periphery of the sun gear 53, thus causing the gear housing, channel bar 30 and associated elements to move in an arcuate or orbital path about the axis of the shaft 42. At the same time as this orbital movement is occurring, the platen 29 is moved laterally with respect to the channel bar 30. By a proper selection of gear ratios the movement of the platen may be caused to be such as to convert an image projected thereon wherein range and bearing are shown in polar coordinates, as in Fig. 5 to an exposed image corresponding to Fig. 6, wherein range is plotted at right angles to bearing.

While any suitable drive may be employed for the shaft 42, the drive shown in Fig. 2 has been found in practice to be satisfactory. This drive comprises a large sprocket wheel or gear 60 which is fixed to the lower end of the shaft 42 and around which passes a sprocket chain 61 which also passes over a somewhat smaller sprocket gear 62 mounted on and fixed to the lower end of a shaft 63. The hub 64 of the gear 62 serves as a bearing and is journaled in and extends through an extended portion 65 integrally formed with the left mid-portion of the easel base 27 as viewed in Fig. 2. A bell crank 66 is mounted on and keyed to the upper end of the shaft 63 to permit manual turning of the shaft and a pedestal member 69 is attached to the underside of the outer end of the portion 65 to provide the required rigidity.

When employing this apparatus a suitable negative is positioned in the negative carrier 17 which is then assembled in the negative housing 15 of the projection printing apparatus shown in Fig. 1 and a sheet of film or paper positioned on the platen 29, being retained thereon by the clips 34. To facilitate locating paper or film on the platen 29 the mask 26 is pivotally supported along the rear edge of the channel bar 30 by a suitable hinge assembly, designated generally as 67 and shown in Figs. 2, 3, and 4, the mask being provided with a knob 68 which is mounted substantially at the center of its right edge as viewed in these drawings. The mask is then positioned over the platen 29 so that light may reach the platen only through the slot 25, and the platen 29 is moved by manipulating the crank 66 to either of the two extreme positions of its travel. The center of the projected image, that is the point corresponding to the point of intersection of the lines 1, 2, 3, 4, and 5 of Fig. 5, is then aligned with the base of the slot 25 formed in the mask 26 by moving the easel. Then, in accordance with usual photographic practice, the exposure is made. However, during exposure the crank 66 is manipulated to cause the platen 29 to travel from the initial extreme position to the opposite extreme position at a uniform rate. In practice, it has been found, that uniform exposures are easily obtained by selecting the intensity of the projected image so that a sufficiently long exposure is possible to permit the platen to be reciprocated back and forth several times.

Referring to Fig. 5 and to Fig. 6 it will be seen that in the operation of the method and apparatus of this invention the point corresponding to the center of the semi-circle illustrated in Fig. 5 is by the complex movement of the platen 29 expanded to a line corresponding to the base of the rectangle shown in Fig. 6. The range rings A, B, C, D and E of Fig. 5 then become straight parallel horizontal lines, spaced equally from each other and progressively further from the base line of Fig. 6, while the radial bearing lines 1, 2, 3, 4, and 5 of Fig. 5 similarly become straight parallel vertical lines extending at right angles to the range lines and equally spaced from each other and progressively further spaced from the zero bearing line corresponding to the left side of the rectangle of Fig. 6.

Where herein the various parts of this invention have been referred to as being located in a right or left position, it will be understood that this is done solely for the purpose of facilitating description and that the references relate only to the relative positions of the parts as shown in the accompanying drawings.

While but one embodiment of this invention has been shown and described it will be understood that many changes and modifications may be made therein without departing from the spirit or scope of the present invention.

What is claimed is:

1. A photographic easel comprising a support for a sheet of film or paper, an opaque mask positioned over said support and having a slot formed therein, means for moving said paper support at right angles to said slot, and means for moving both said mask and said paper support together as a unit in an arcuate path in a plane parallel to the plane of the sheet of film or paper.

2. A photographic easel comprising a support for a sheet of film or paper, an opaque mask positioned over said support and having a slot formed therein, a rack and pinion movement for causing said paper support to move at right angles to said slot, and an epicyclic gear train for moving said mask and said paper support in an arcuate path.

3. A method of converting a photograph wherein range and bearing are plotted along polar coordinates to a photograph wherein range is plotted at right angles to bearing comprising projecting an image of such a photograph on a sheet of photo-sensitized material through a mask slot, moving the photo-sensitized material at right angles relatively to the slot, and at the same time moving the photo-sensitized material and slot in an arcuate path.

4. A method of converting a photograph wherein range and bearing are plotted along polar coordinates to a photograph wherein range is plotted at right angles to bearing comprising projecting an image of such a photograph on a sheet of photo-sensitized material through a mask slot, moving the photo-sensitized material at right angles relatively to the slot, and at the same time moving the photo-sensitized material and slot in an arcuate path, the axis of which is aligned with the center of the projected image.

5. An easel for use with a projection printing apparatus comprising a platen for supporting a sheet of photo-sensitized material, a mask positioned over said platen and having formed therein a slot, means for moving said platen at right angles to said slot, and means for moving said mask and said platen in an arcuate path about an axis corresponding to the base of said slot.

6. An apparatus for converting a photograph wherein range and bearing are plotted along polar coordinates to a photograph wherein range is plotted at right angles to bearing comprising means for projecting an image of such a photograph, a platen associated with said projecting means for supporting a sheet of sensitized material, a mask positioned over said platen and having a slot formed therein, the base of said slot being aligned with the axis of the projected image, means for moving said platen at right angles to said slot, and means for moving said mask and said platen in an arcuate path about the axis of said projected image.

DEAN B. McLAUGHLIN.
GERALD S. PERKINS.

REFERENCES CITED

The following references are of record in the file of this patent:

UNITED STATES PATENTS

| Number | Name | Date |
|---|---|---|
| 831,426 | Goddard | Sept. 18, 1906 |
| 1,176,384 | Lotka | Mar. 21, 1916 |
| 1,528,021 | Janzer et al. | Mar. 3, 1925 |
| 1,652,271 | Cooke | Dec. 13, 1927 |
| 1,906,973 | Kingsbury | May 2, 1933 |
| 2,059,633 | Farber | Nov. 3, 1936 |

FOREIGN PATENTS

| Number | Country | Date |
|---|---|---|
| 382,729 | Great Britain | Nov. 3, 1932 |